United States Patent [19]
Dyba

[11] Patent Number: 6,119,139
[45] Date of Patent: Sep. 12, 2000

[54] VIRTUAL WINDOWING FOR FIXED-POINT DIGITAL SIGNAL PROCESSORS

[75] Inventor: Roman Anthony Dyba, Woodbridge, Canada

[73] Assignee: Nortel Networks Corporation, Montreal, Canada

[21] Appl. No.: 08/959,461

[22] Filed: Oct. 27, 1997

[51] Int. Cl.[7] ................................................. G06F 17/10
[52] U.S. Cl. ........................................... 708/309; 702/75
[58] Field of Search ...................... 364/724.011, 724.06, 364/724.07, 724.08, 724.09, 724.12; 708/300, 309, 310, 311, 312, 403; 702/75, 76, 77

[56] References Cited

U.S. PATENT DOCUMENTS

| | | | |
|---|---|---|---|
| 5,163,050 | 11/1992 | Cromack | 370/110.3 |
| 5,373,460 | 12/1994 | Marks, II | 364/724.01 |
| 5,548,543 | 8/1996 | Wang | 364/724.16 |
| 5,651,092 | 7/1997 | Ishii et al. | 704/226 |

*Primary Examiner*—Chuong Dinh Ngo

[57] ABSTRACT

To determine the frequency content of a time series, a time series segment which spans a time interval is received. A time interval spanned by a symmetric tapered window with quantised elements is chosen such that the window time interval is greater than the segment time interval such that when the window is centered with respect to the segment time interval, the window element at either end of the segment time interval has the lowest available non-zero quantised value. Lastly a frequency representation of said time series may be obtained based on the time series segment and the quantised window.

10 Claims, 4 Drawing Sheets

2

VIRTUAL WINDOWING FOR FIXED-POINT DIGITAL SIGNAL PROCESSORS

BACKGROUND OF THE INVENTION

This invention relates to a method and apparatus for determining the frequency content of a time series.

A digital signal comprises a series of discrete valued elements (or samples) known as a time series. It is often desired to determine the frequency content of a digital signal to, for example, allow detection of a tone in a noisy signal. A frequency content determination is necessarily based on a segment of the signal over a limited time interval. This signal segment may be obtained by multiplying the time series by a function which has a time interval equal to the time interval chosen for the segment. The function is known as a "window" and the simplest window is a rectangular window which truncates the time series to the chosen time interval without altering the relative values of elements of the segment. A window is also represented by a series of discrete valued (quantised) elements. A discrete Fourier transform of the product provides information on the frequency content of the segment.

One drawback of applying a window to a time series is that the window results in frequency "leakage". That is, any given frequency in a time series will, after multiplication with a window, spread out over the whole frequency range. The result in the Fourier domain is sidelobes around each lobe representing a frequency in the series. With a rectangular window, these side lobes are large and may interfere with proper identification of the main lobes which represent the frequencies actually in the time series.

Another problem with a rectangular window is that the discontinuities of the window result in oscillations in the frequency domain no matter how many discrete elements make up the window. This is known as the Gibbs phenomenon.

To address the problem of leakage as well as the Gibbs effect, a number of non-discontinuous non-rectangular windows have been developed. Such windows are symmetric and taper to zero or to a smaller non-zero value at either end. An exemplary non-rectangular window is the Blackman window, which is a triangular window. The weighting that these windows apply to the time series segment reduces the size of the sidelobes. However, these tapered windows also increase the width of the main lobes, which decreases frequency resolution (i.e., two closely spacely frequencies may be seen as one lobe). The resolution problem may be combatted by increasing the number of samples in the segment (i.e., increasing segment time interval), however, this increases processing time, and so there is a trade-off to address in any design.

A digital fixed point representation of a non-rectangular window is generally an approximation of the true window shape with the degree of approximation depending upon how many levels of quantisation are available to represent each point in the window. I have recognised that, because of this, a digitally represented window may have zero-valued end portions which reduce the number of elements of the time series segment contributing to the frequency determination.

This invention seeks to overcome drawbacks of known windowing systems.

SUMMARY OF THE INVENTION

According to the present invention, there is provided a method of determining the frequency content of a time series, comprising the steps of: receiving a time series segment, said segment comprising a number of samples of said time series, said samples spanning a time interval; choosing a time interval spanned by a symmetric tapered window with quantised elements, said window time interval being greater than said segment time interval so that when said window is centered with respect to said segment time interval, said window has the smallest available quantised value at an element at either end of said segment time interval; obtaining a frequency representation of said time series based on said time series segment and said quantised window.

According to another aspect of this invention, there is provided an apparatus for determining the frequency content of a time series, comprising: a sampler for receiving a number of samples of said time series so as to provide a time series segment spanning a segment time interval; a determiner for determining a time interval of a symmetric tapered window with quantised elements such that said window time interval is greater than said segment time interval so that, when said window is centred with respect to said segment time interval, said window has the smallest available quantised value at an element at either end of said segment time interval; means responsive to said sampler and said determiner for obtaining a frequency representation of said time series.

BRIEF DESCRIPTION OF THE DRAWINGS

In the figures which disclose example embodiments of the invention.

DESCRIPTION OF THE PREFERRED EMBODIMENTS

Figure 1:
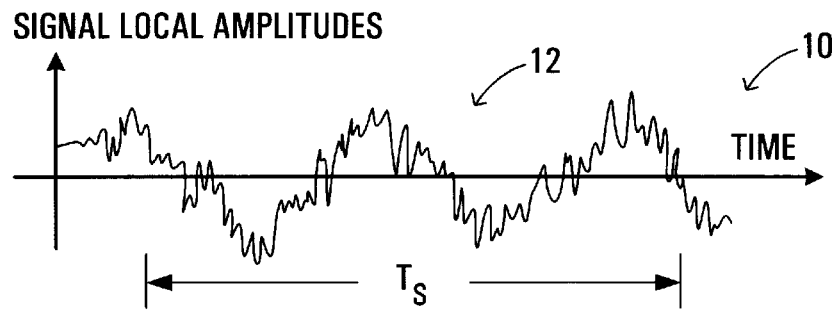
FIG. 1 is a signal waveform.

FIG. 1 is a time versus amplitude plot of a sample signal waveform 10. For convenience, the waveform is shown as an analog waveform although it is actually a digital waveform comprising a series of points, each represented by a quantised value.

Figure 2A:
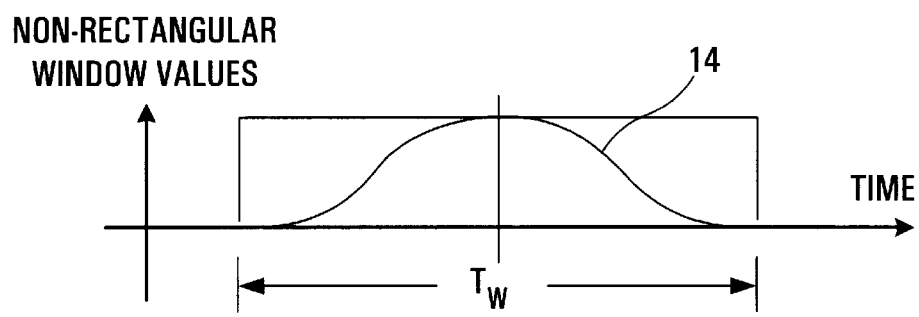
FIG. 2A illustrates a known window.
Figure 2B:
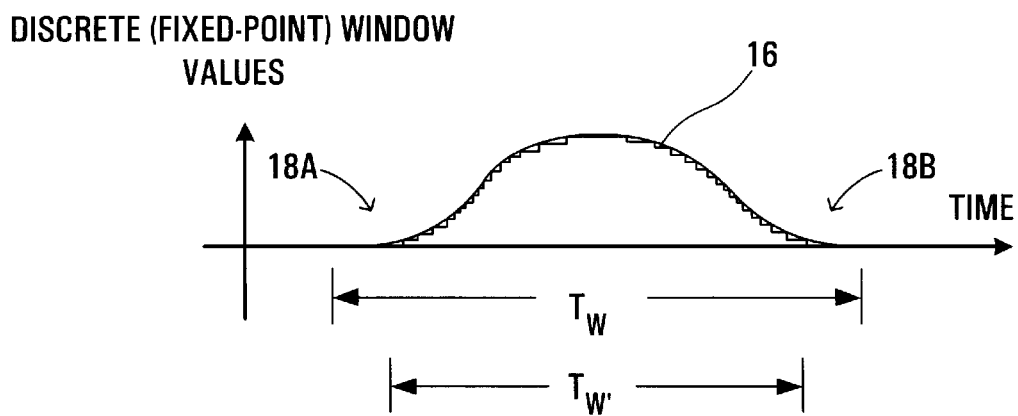
FIG. 2B illustrates a known digitised window.

In order to determine the frequency content of the signal, a segment 12 of the signal is first chosen. This segment comprises a certain number of samples of the signal spanning a time interval $T_S$. Next a window shape is chosen for application to the segment. FIG. 2A illustrates a possible window shape comprising a Hanning window 12, which is a cosine window. In known windowing methods, as illustrated in FIG. 2A, this window spans a time interval $T_W$ equal to that of the time interval, $T_S$ (FIG. 1) of segment 12 (FIG. 1). As illustrated in FIG. 2B, in these known methods, the window is quantised so that each point of the window is represented by a discrete value. Consequently, after quantisation, there will be one discretely valued element of the window for each discretely valued element of the segment 12 (FIG. 1). The number of available levels of quantisation of the quantised window 16 (FIG. 2B) will be a matter of design choice for a given system. Whatever choice is made in this regard, the number is necessarily finite. As a consequence, the digital representation of any point of the window which has a value less than one-half of the lowest level of quantisation is represented by a zero value point. Therefore, as the window ends are approached, the quantised value of the window elements drops, eventually dropping to zero values. In the result, there are a series of zero valued elements at each end portion 18a, 18b of the quantised window. When the quantised window is multiplied by the signal segment, signal samples multiplied by these zero valued window elements are lost. Effectively, then, the time interval spanned by the quantised window drops from $T_W$ to $T_W'$. The extent of reduction of the window time interval will depend on the number of possible levels of quantisation: the lesser the number available, the larger the extent of the reduction consequent upon quantisation. Loss of the samples toward either end of the segment has a significant impact on the accuracy of the determination of the frequency content of the time series, as will be demonstrated hereinafter.

Figure 3:
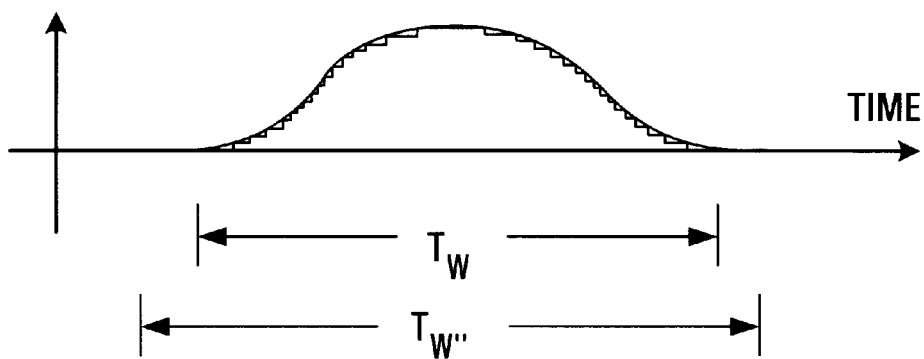
FIG. 3 illustrates a digitised window made in accordance with this invention.

In the subject invention, the time interval, $T_W$, spanned by the true window of FIG. 2A is adjusted to a larger time interval, $T_W''$, such that upon quantisation of the window, the quantised window, as shown in FIG. 3, is not zero valued at any point over the time interval $T_W$. Indeed, preferably, the elements of the quantised window at the end points of the time interval $T_W$ have the lowest non-zero level of quantisation available, with the next adjacent window elements outside of the time interval $T_W$ being zero valued, as illustrated in FIG. 3.

The quantised window of FIG. 3 is then centered about the signal segment 12 (FIG. 1), multiplied by the segment, and a discrete Fourier transform is then taken of the product. Frequency information is available from the Fourier transform representation.

As an alternative, as will be appreciated by those skilled in the art, a discrete Fourier transform may be separately taken of both the segment and the quantised window and these Fourier transform representations then convolved. Frequency information would then be available from the convolution.

Since the window of FIG. 3 has a larger time interval than a standard window, it may be referred to as a virtual window.

Figure 4:
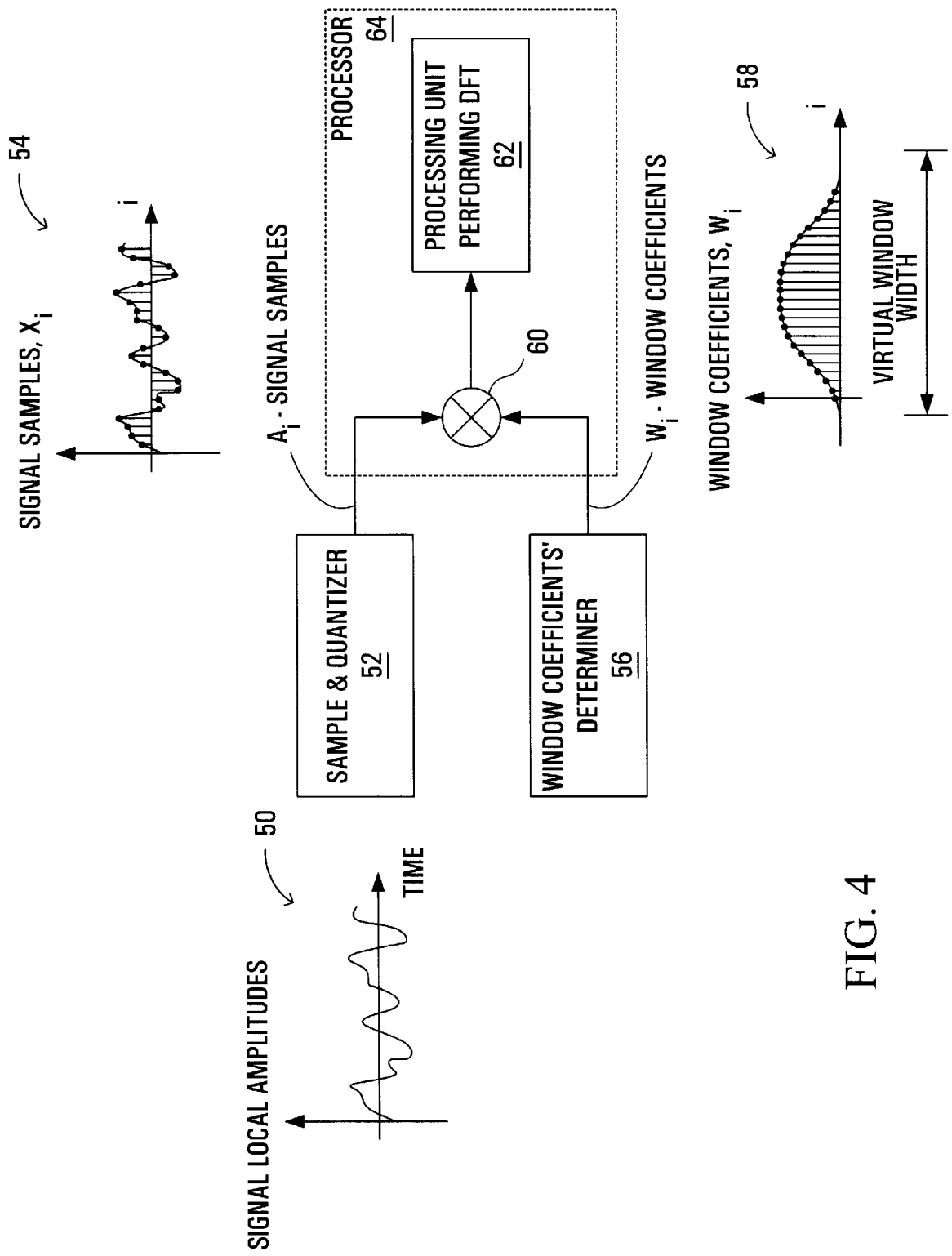
FIG. 4 is a block diagram of sample apparatus for implementing this invention.

FIG. 4 illustrates an exemplary apparatus to realise the method of this invention. Turning to FIG. 4, a signal 50 enters a sampler 52 which may store a sample segment 54. A determiner 56 selects a window shape 58 and chooses a time interval for a virtual window of this shape so that the quantised version of the virtual window is non-zero valued over a time interval spanning the segment time interval. This selection of the virtual window time interval may be iteratively determined. The determiner and sampler send elements to a multiplier 60 which multiplies each element of the window with a corresponding element of the segment. In other words, multiplication occurs in such a way that the window time interval is centered with respect to the segment time interval. Fourier transformer 62 then takes a discrete Fourier transform of this product. The output of the transformer inputs processor 64.

Processor 64 could comprise a band-pass filter, a guard-band pass filter and a comparator which would adapt the apparatus for detection of a tone in the pass-band. Alternatively, processor 64 could act as a signal smoother for the time series.

Figure 5:
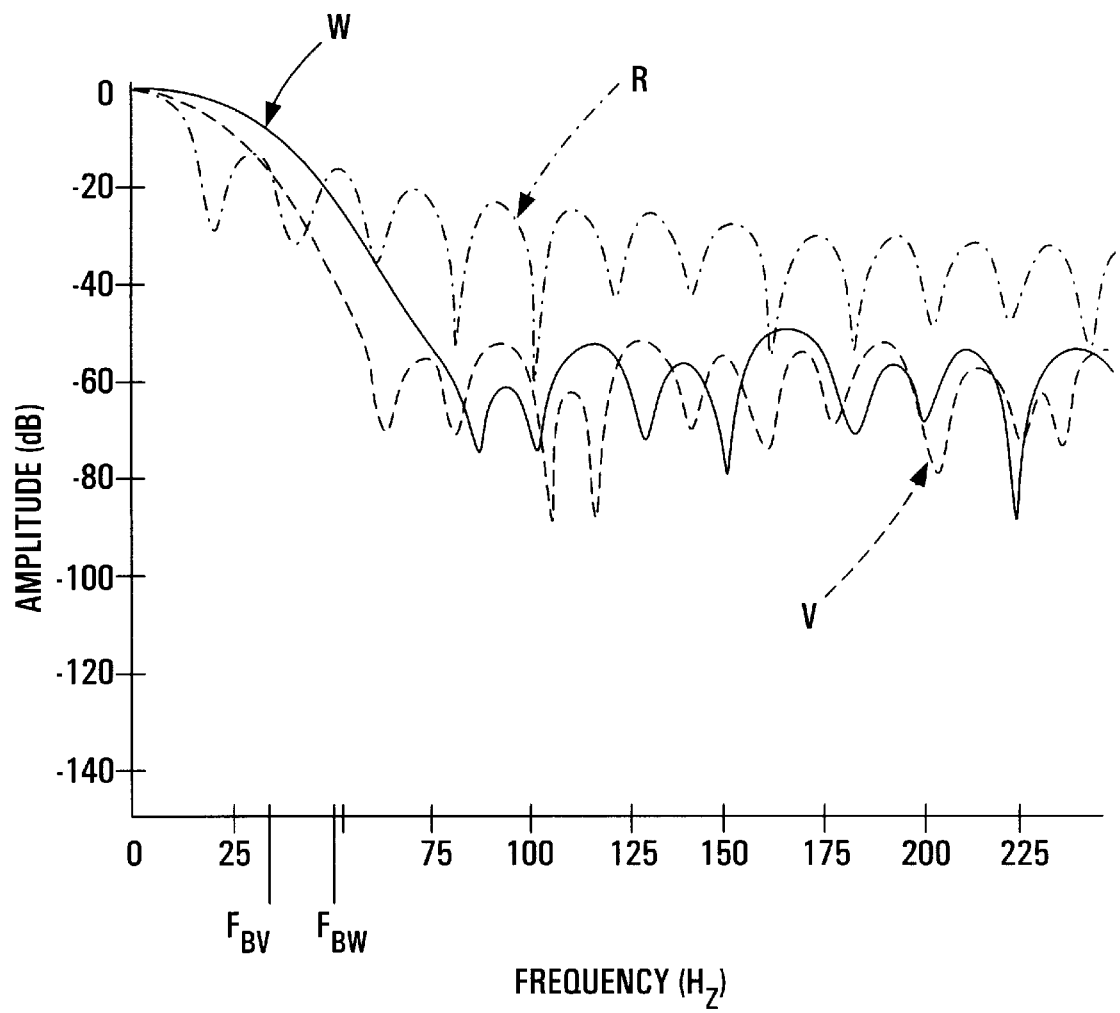
FIG. 5 is a plot indicating the effect of a window in accordance with this invention.

FIG. 5 provides an example showing the effectiveness of this invention. Turning to FIG. 5, the amplitudes of the discrete Fourier transforms of three windows are shown, with each window being a five-bit precision window (i.e., a window with 32 levels of quantisation) having four elements. Window R is a rectangular window, window W is a standard multi-cosine window (having four cosine terms) spanning the same time interval as the rectangular window R, and virtual window V is a multi-cosine window spanning a time interval such that the virtual window has a quantised value of 1 at either end of the time interval spanned by the rectangular window R.

From FIG. 5, it will be noted that the standard window W breaks below the envelope of the rectangular window at the frequency break point, $F_{BW}$, of 45.7 Hz. In contrast, the virtual window V has a frequency break-point, $F_{BV}$, at the frequency 30.3 Hz. An earlier break-point means better frequency discrimination and the break-point of the virtual multi-cosine window is 50.7% lower than that of the standard multi-cosine window.

It will be appreciated that the principles of the subject invention apply to any symmetric tapered window such as a Blackman window, a Hamming window, a Hanning window, a Bartlett window, a Kaiser window, and a Nuttell (multi-cosine) window.

Modifications will be apparent to those skilled in the art and, accordingly, the invention is defined in the claims.

What is claimed is:

1. A method of determining the frequency content of a time series, comprising the steps of:

receiving a time series segment, said segment comprising a number of samples of said time series, said samples spanning a time interval;

choosing a time interval spanned by a symmetric tapered window with quantised elements, said window time interval being greater than said segment time interval so that when said window is entered with respect to said segment time interval, said window has the smallest available quantised value at an element at either end of said segment time interval;

obtaining a frequency representation of said time series based on said time series segment and said quantised window.

2. The method of claim 1 wherein said frequency representation is a discrete Fourier transform representation.

3. The method of claim 2 wherein said symmetric tapered window comprises one of a Blackman window, a Hamming window, a Hanning window, a Bartlett window, a Kaiser window, and a Nuttell window.

4. The method of claim 2 wherein said step of obtaining a frequency representation of said time series based on said time series segment and said quantised window comprises multiplying said centered quantised window by said segment to obtain a product and obtaining a discrete Fourier transform representation of said product.

5. The method of claim 2 wherein said step of obtaining a frequency representation of said time series based on said time series segment and said quantised window comprises obtaining a discrete Fourier transform representation of said centered quantised window, obtaining a discrete Fourier transform representation of said segment and convolving said discrete Fourier transform representation of said centered quantised window with said discrete Fourier transform representation of said segment.

6. The method of claim 1 including the step of selecting a symmetric tapered window shape for application to said segment and wherein said step of choosing a time interval of a symmetric window comprises choosing a time interval of a symmetric window having said window shape.

7. Apparatus for determining the frequency content of a time series, comprising:

a sampler for receiving a number of samples of said time series so as to provide a time series segment spanning a segment time interval;

a determiner for determining a time interval of a symmetric tapered window with quantised elements such that said window time interval is greater than said segment time interval so that, when said window is centred with respect to said segment time interval, said window has the smallest available quantised value at an element at either end of said segment time interval;

means responsive to said sampler and said determiner for obtaining a frequency representation of said time series.

8. The apparatus of claim 7 including a selector for selecting a symmetric tapered window shape for application to said segment and wherein said determiner is responsive to said selector so as to determine a time interval of a symmetric window having said window shape.

9. The apparatus of claim 8 wherein said means for obtaining a frequency representation of said time series comprises a multiplier for multiplying said window by said segment to obtain a product and a Fourier transformer for obtaining a Fourier representation of said product.

10. A tone detector for a time series comprising:

a sampler for receiving a number of samples of said time series so as to provide a time series segment having a segment duration;

a determiner for determining a duration of a symmetric tapered window with discretely valued elements such that said window duration is greater than said segment duration so that said window has the smallest available quantised value at an element at either end of said segment;

a multiplier for multiplying said window by said segment to obtain a product;

means responsive to said sampler and said determiner for obtaining a frequency representation of said time series; and a detector responsive to said means for obtaining a frequency representation to detect one or more tones in said time series.

* * * * *